United States Patent
Amblard et al.

(10) Patent No.: US 11,549,074 B2
(45) Date of Patent: Jan. 10, 2023

(54) DEVICE COMPRISING LATERAL INJECTIONS OF LIQUID FOR LIMITING THE PHENOMENA OF SOLID DEPOSITS IN ITEMS OF EQUIPMENT WITH A CONICAL BOTTOM

(71) Applicant: IFP Energies Nouvelles, Rueil-Malmaison (FR)

(72) Inventors: Benjamin Amblard, Lyons (FR); Joao Marques, Chasse sur Rhone (FR); Jean-Francois Le Coz, Saint Germain en Laye (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 17/121,977

(22) Filed: Dec. 15, 2020

(65) Prior Publication Data

US 2021/0095214 A1  Apr. 1, 2021

Related U.S. Application Data

(62) Division of application No. 16/158,414, filed on Oct. 12, 2018, now abandoned.

(30) Foreign Application Priority Data

Oct. 13, 2017 (FR) ...................................... 1759606

(51) Int. Cl.
| | | |
|---|---|---|
| *C10G 75/00* | (2006.01) | |
| *B01J 8/08* | (2006.01) | |
| *C10G 51/04* | (2006.01) | |
| *C10G 65/12* | (2006.01) | |
| *C10G 65/10* | (2006.01) | |
| *B01J 19/24* | (2006.01) | |
| *B01J 19/26* | (2006.01) | |

(Continued)

(52) U.S. Cl.
CPC .............. *C10G 75/00* (2013.01); *B01J 8/085* (2013.01); *B01J 19/24* (2013.01); *B01J 19/2465* (2013.01); *B01J 19/26* (2013.01); *C10G 47/26* (2013.01); *C10G 51/04* (2013.01); *C10G 65/10* (2013.01); *C10G 65/12* (2013.01); *C10G 67/049* (2013.01); *B01J 2208/00893* (2013.01); *B01J 2219/00247* (2013.01); *B01J 2219/00252* (2013.01); *B01J 2219/185* (2013.01); *B01J 2219/1943* (2013.01); *B01J 2219/1946* (2013.01)

(58) Field of Classification Search
None
See application file for complete search history.

(56) References Cited

U.S. PATENT DOCUMENTS

| | | |
|---|---|---|
| 3,846,079 A | 11/1974 | Alagy et al. |
| 4,146,359 A | 3/1979 | Lumpkin et al. |

(Continued)

OTHER PUBLICATIONS

Search Report dated Apr. 19, 2018 issued in corresponding FR 1759606 application (2 pages).

*Primary Examiner* — Tam M Nguyen
(74) *Attorney, Agent, or Firm* — Millen White Zelano and Branigan, PC; Csaba Henter (57) ABSTRACT

A device for the descending flow of a hydrocarbon-containing liquid containing solid particles at the bottom of an item of equipment (1) and a process for the conversion of hydrocarbon-containing feedstocks implementing said device.

24 Claims, 4 Drawing Sheets

(51) Int. Cl.
*C10G 67/04* (2006.01)
*C10G 47/26* (2006.01)

(56) References Cited

U.S. PATENT DOCUMENTS

| | | | | |
|---|---|---|---|---|
| 6,238,912 | B1 | 5/2001 | Moore et al. | |
| 9,637,572 | B2* | 5/2017 | Banat | C08F 2/34 |
| 2006/0201065 | A1* | 9/2006 | Lucas | B01F 25/23 |
| | | | | 422/607 |
| 2012/0024718 | A1* | 2/2012 | Foret | C02F 11/004 |
| | | | | 205/687 |
| 2015/0218295 | A1* | 8/2015 | Kanellopoulos | B01J 8/388 |
| | | | | 526/67 |
| 2016/0297899 | A1* | 10/2016 | Banat | C08F 10/06 |
| 2016/0297900 | A1* | 10/2016 | Banat | C08F 10/06 |
| 2016/0346758 | A1* | 12/2016 | Kress | C01B 3/06 |
| 2017/0002113 | A1* | 1/2017 | Banat | B01J 8/087 |
| 2017/0333815 | A1* | 11/2017 | Kompala | C12N 5/0636 |
| 2018/0251582 | A1* | 9/2018 | Banat | C08F 10/02 |
| 2019/0193044 | A1* | 6/2019 | Sunkara | C01F 7/422 |
| 2019/0210042 | A1* | 7/2019 | Kompala | C12Q 3/00 |

* cited by examiner

DEVICE COMPRISING LATERAL INJECTIONS OF LIQUID FOR LIMITING THE PHENOMENA OF SOLID DEPOSITS IN ITEMS OF EQUIPMENT WITH A CONICAL BOTTOM

TECHNICAL FIELD OF THE INVENTION

The invention relates to the field of the reduction of deposits of sediments or of unstable or insoluble molecules in separation and distillation equipment preferentially with a conical bottom, which are utilized downstream of the refining processes treating heavy or fouling products. The invention relates non-limitatively to processes producing liquids capable of fouling items of equipment, such as visbreaking, hydrocracking in an ebullating bed, catalytic cracking, delayed coking in the refining of oil products as well as the processes of coal liquefaction and biomass treatment.

PRIOR ART

The reduction of deposits fouling items of equipment is a major problem in units for the treatment or conversion of hydrocarbon-containing feedstocks, in particular for heavy feedstocks. In fact, the fouling of items of equipment requires stopping the unit and disassembling it in order to carry out the cleaning. In the units for the conversion of hydrocarbon-containing feedstocks in an ebullating bed, in particular, fouling of the walls and of the bottom of the items of separation equipment can be due to particles of asphaltenic nature which flocculate to form solid deposits, molecules which are adsorbed onto the wall, coke particles, catalyst fines, metal sulphides based on nickel, iron and/or vanadium or more generally any solid contained in the hydrocarbon-containing feedstock treated.

Patent application U.S. Pat. No. 4,534,851 A describes a method of introducing a liquid hydrocarbon-containing feedstock into a transfer line to a reaction zone, comprising an injection of steam and of the hydrocarbon-containing feedstock under ascending flow with separate concentric streams, the stream of hydrocarbon-containing feedstock being the inner stream and the stream of steam being the circumferential stream, and the direction of a portion of the steam towards the inner wall of said transfer line, while the remainder of the steam and the hydrocarbon-containing feedstock are discharged from the zone in a direction parallel to the longitudinal axis.

However this application does not describe a device allowing the reduction of the stagnant zones by recycling the hydrocarbon-containing liquid or an external makeup liquid both inside of the truncated-cone-shaped part and/or inside the cylindrical part of the item of equipment.

SUMMARY OF THE INVENTION

The invention relates to a device for the descending flow of a hydrocarbon-containing liquid containing solid particles at the bottom of an item of equipment (1) comprising a cylindrical upper part (11) of diameter D1, a truncated-cone-shaped lower part (12) with an angle of inclination $\alpha$ comprised between 5° and 85° with respect to the vertical axis (z) of said cylindrical upper part, an outlet pipe (9) of diameter D2, characterized in that it comprises:

at least one injection (5) of recycled and/or makeup liquid into the truncated-cone-shaped part (12) of the item of equipment (1);

at least one injection (6) of recycled and/or makeup liquid into the cylindrical part (11) of the item of equipment (1);

said injection or injections (5) situated in said truncated-cone-shaped part being inclined with respect to the wall of the truncated-cone-shaped lower part at an angle $\beta1$ in the vertical plane (xz) and at an angle $\beta2$ in the horizontal plane (xy); said injection or injections (6) situated in said cylindrical part being inclined with respect to the wall of the cylindrical upper part at an angle $\theta1$ in the vertical plane (xz) and at an angle $\theta2$ in the horizontal plane (xy), the angles $\beta1$ and $\theta1$ being comprised between 5° and 175°, the angles $\beta2$ and $\theta2$ being comprised between 90° and 270°.

Advantageously, the device according to the invention comprises a pipe (4) for recycling a part of the liquid leaving said outlet pipe (9), said recycling pipe (4) supplying at least one of said injections (5) or (6) with recycled liquid.

The device according to the invention can comprise a makeup pipe (10) for supplying makeup liquid to at least one of said injections (5) or (6).

Said injections can be distributed by horizontal layers (7) in the truncated-cone-shaped part and by horizontal layers (8) in the cylindrical part respectively.

Advantageously, the ratio between the diameter D1 of the cylindrical part and the diameter D2 of the outlet pipe at the bottom of the truncated-cone-shaped part (D1/D2) is comprised between 1.1 and 1000, preferably between 2 and 500 and preferably between 3 and 100.

Advantageously, the angle $\alpha$ is comprised between 10° and 70°, preferably between 15° and 60° and very preferably between 30° and 50°.

Preferably, the angles $\beta1$ and $\theta1$ are comprised between 10° and 150°, very preferably between 15° and 120°, more preferably between 15° and 90° and yet more preferably between 20° and 60°.

Preferably, the angles $\beta2$ and $\theta2$ are comprised between 90° and 180°.

Very preferably, the angles $\beta2$ and $\theta2$ are equal to 90°.

Advantageously, the diameter D1 is comprised between 0.1 m and 30 m, preferably between 0.5 m and 20 m, and very preferably between 1 m and 10 m.

Advantageously, the height H between two horizontal layers is comprised between 0.01 m and 10 m, preferably between 0.05 m and 5 m and very preferably between 0.1 m and 1 m.

Preferably, the number of injections N per layer is comprised between 1 and 30.

Preferably, the number of injections per layer is comprised between 2 and 20, said injections within one and the same layer being spaced at an angle $\delta$ equal to 360/N where N denotes the number of injections per layer.

Very preferably, the number of injections per layer is comprised between 2 and 10, yet more preferably between 2 and 6.

Preferably, the item of equipment (1) is a means for the separation of gas/liquid allowing hydrocarbon-containing feedstocks to be treated.

The invention also relates to a process for the conversion of hydrocarbon-containing feedstocks implementing said device.

Preferably, said process implements a hydroconversion step in an ebullating bed for feedstocks containing hydrocarbon fractions of which at least 50% by weight have a boiling temperature greater than 300° C.

The velocity V of the liquid injected in said injections is advantageously comprised between 0.05 m·s$^{-1}$ and 40 m·s$^{-1}$, preferably between 0.1 m·s$^{-1}$ and 30 m·s$^{-1}$ and very preferably between 0.5 m·s$^{-1}$ and 10 m·s$^{-1}$.

The injection rate of liquid injected by the injections (5) and (6) with respect to the liquid circulating in the item of equipment (1) is advantageously comprised between 1% and 400%, preferably between 5% and 100%, very preferably between 10% and 60% and yet more preferably between 20 and 50%.

BRIEF PRESENTATION OF THE FIGURES

Other characteristics and advantages of the device according to the invention will become apparent on reading the following description of non-limitative embodiment examples, with reference to the attached figures which are described below.

DETAILED DESCRIPTION OF THE INVENTION

Generally, the invention relates to any item of equipment in which a hydrocarbon-containing liquid circulates with the possibility of stagnation and accumulation of solid particles at the bottom of the item of equipment. More particularly, the device according to the invention is situated in the lower part of an atmospheric or vacuum distillation column, separation drum or any other means of gas/liquid separation making it possible to treat hydrocarbon-containing feedstocks.

In the remainder of the text, by "injection" is meant any means known to a person skilled in the art making it possible to inject liquid from the wall of the item of equipment to the inside, said means being supplied by at least one pipe for transporting liquid.

Figure 1:
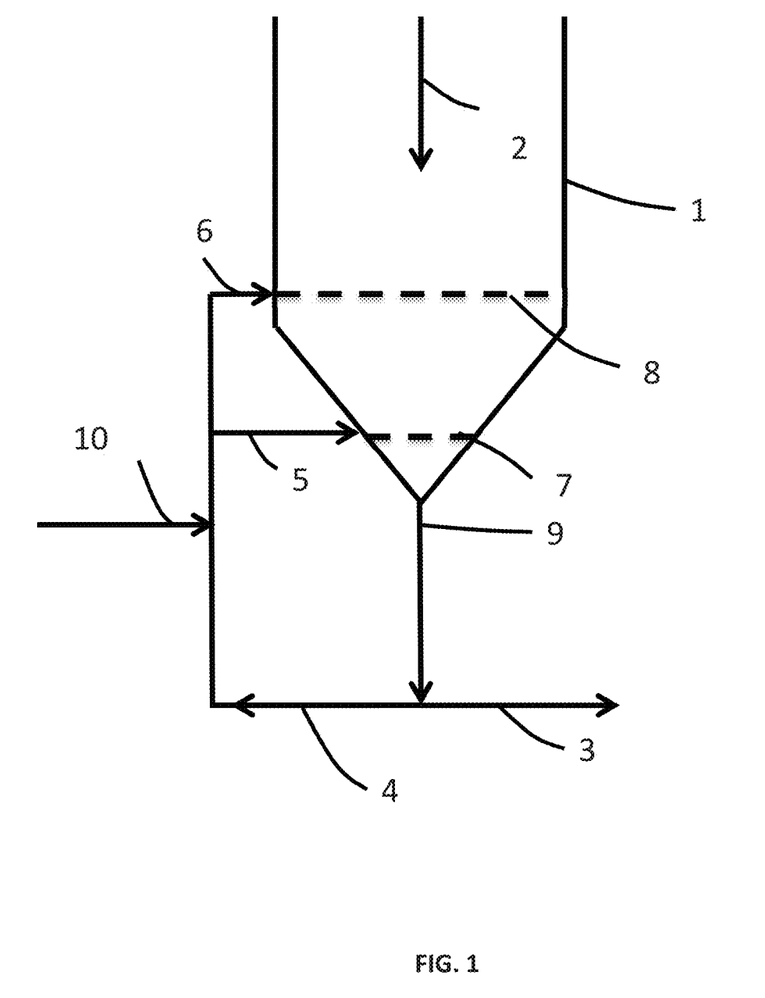
FIG. 1 shows the schematic diagram of the device according to the invention.

FIG. 1 shows the schematic diagram of the invention.

The invention is implemented in an item of equipment (1) with a conical bottom, i.e. comprising a cylindrical upper part (11) and a truncated-cone-shaped lower part (12) where a fouling hydrocarbon-containing liquid (2) (i.e. a liquid containing solid particles or compounds capable of flocculating or adsorbing onto the wall) flows in a descending manner from the top of the item of equipment and leaves through an outlet pipe (9). The truncated-cone-shaped form is well known to a person skilled in the art for minimizing the deposit in the bottom by facilitating the drainage of the solids by gravity to the outlet pipe.

In order to reduce the formation of the deposits on the wall and in the bottom of the item of equipment, the device comprises lateral injections of recycled and/or makeup liquid: injections into the truncated-cone-shaped part (5) and injections into the cylindrical part (6). These injections can be distributed to the wall along horizontal layers in the truncated-cone-shaped part (7) and along horizontal layers in the cylindrical part (8). The outgoing liquid stream is discharged from the item of equipment via a discharge pipe (3).

In a first embodiment of the invention, a makeup pipe for liquid (which can be a fluxing liquid) (10) supplies the lateral injections (5) and (6) situated in the truncated-cone-shaped part and in the cylindrical part, in order to reduce the stagnant zones in the item of equipment (1) and to limit the deposits of solid particles on the walls. Any cut with a boiling point greater than or equal to the boiling point of the hydrocarbon-containing liquid supplying the item of equipment (1), for example catalytic cracking effluent (HCO), LCO, or any other VGO, AR, VR, DAO cut, aromatic extract, can be suitable as makeup liquid.

According to this embodiment the flow rate of liquid leaving via the discharge pipe (3) is equal to the sum of the flow rate of hydrocarbon-containing liquid circulating in the item of equipment (2) and the flow rate of makeup liquid injected into the makeup pipe (10). The makeup liquid injected through the makeup pipe (10) makes it possible to reduce the stagnant zones by generating a turbulence in the item of equipment (1) in order to limit the deposits of solid particles on the walls. Said injected makeup liquid can also act as a flux when the chosen liquid is an aromatic base.

According to another embodiment of the invention, a part of the hydrocarbon-containing liquid leaving the item of equipment (1) can be recycled in order to supply the lateral injections (5) and (6). According to this embodiment the flow rate of liquid leaving via the discharge pipe (3) is equal to the flow rate of liquid (2). The liquid recycled through the recycling pipe (4) makes it possible to reduce the stagnant zones in the item of equipment (1) by generating a turbulence in order to limit the deposits of solid particles on the walls.

According to a last embodiment of the invention, the liquid injected into the lateral injections (5) and (6) can originate both from the recycling pipe (4) and from the makeup liquid pipe (10). According to this embodiment, the flow rate of liquid leaving via the discharge pipe (3) is equal to the sum of the flow rate of hydrocarbon-containing liquid circulating in the item of equipment, called fouling liquid (2), and the flow rate of makeup liquid injected into the makeup pipe (10). The liquid injected through the makeup pipe (10) and through the recycling pipe (4) makes it possible to reduce the stagnant zones by generating a turbulence in the item of equipment (1) in order to limit the deposits of solid particles on the walls and can also act as a flux as mentioned previously.

The liquid injected by the lateral injections (5) and (6) can therefore be liquid recycled from the item of equipment (1) and/or makeup liquid, i.e. a liquid originating from outside of the item of equipment (1).

The injection rate of the liquid injected by the lateral injections (5) and (6) is defined as being the ratio between the sum of the flow rate of liquid in the recycling pipe (4) and the flow rate of liquid in the makeup pipe (10) to the flow rate of hydrocarbon-containing liquid circulating in the item of equipment or fouling liquid (2).

The feedstock entering the device can contain any type of compounds originating from an effluent of a hydroconversion process, for example originating from an H-OIL™ ebullating bed unit, but also any type of compounds originating from a slurry hydroconversion process, from a fixed bed, moving bed, fluidized bed hydrotreatment process, catalytic cracking (FCC) effluent, effluents from thermal conversion processes such as coking, visbreaking, and any other separation process such as for example solvent deasphalting.

The solid particles can be precipitated asphaltenes, supported or unsupported catalyst fines (usually with a diameter of less than 500 microns) or coke particles, sulphides of metals such as nickel, vanadium, iron, molybdenum.

The flow in the device is descending, the device according to the invention can be utilized at the bottom of a vacuum distillation column or at the bottom of an atmospheric column or at the bottom of any gas-liquid separator.

Figure 2:
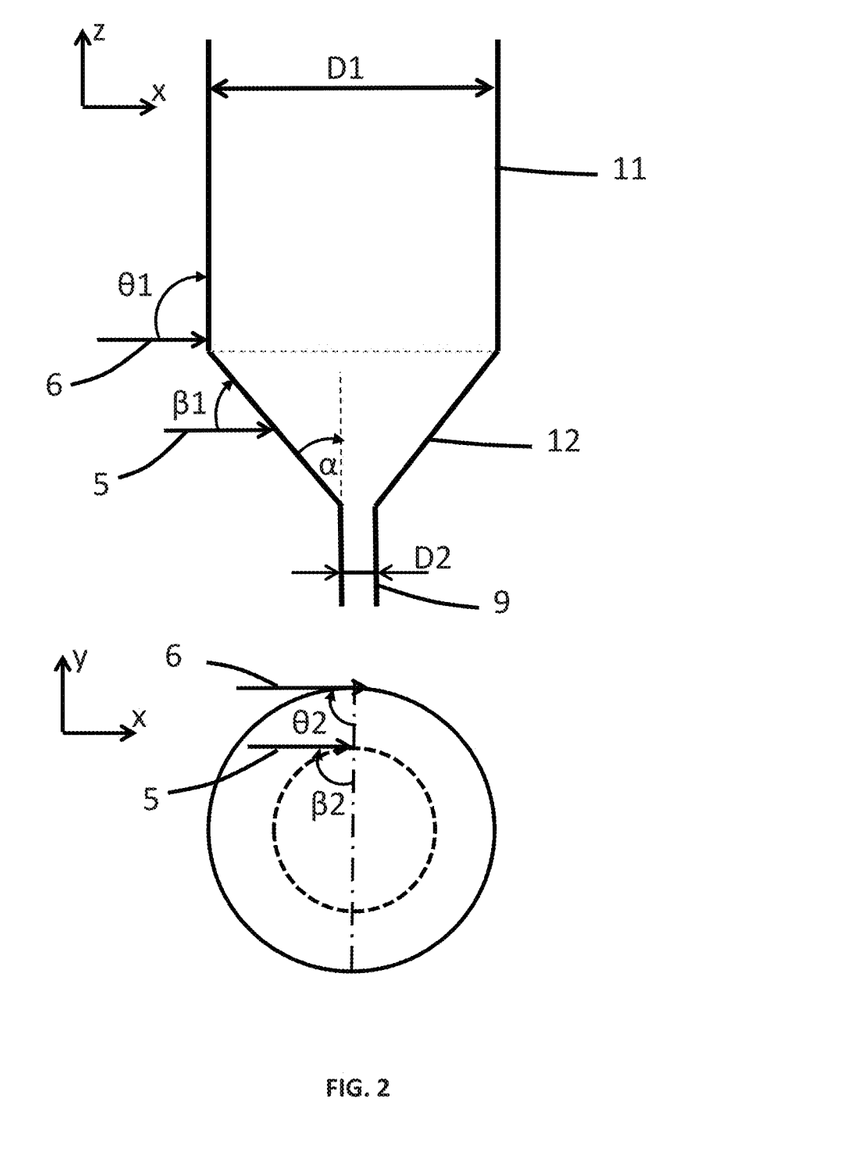
FIG. 2 shows the utilization of the injections of recycled hydrocarbon-containing and/or makeup liquid inside the cylindrical and truncated-cone-shaped parts of the item of equipment.

FIG. 2 shows the different types of lateral injections of the recycled part of the liquid or of the makeup liquid.

The item of equipment 1, which can be for example a distillation column or a separator, has a cylindrical upper part (11) of diameter D1, a truncated-cone-shaped lower part (12), an outlet pipe (9) situated at the bottom of the item of equipment, through which the hydrocarbon-containing liquid leaves, of diameter D2. The truncated-cone-shaped part (12) (also called conical bottom) has an angle of inclination α, with respect to the vertical wall of the cylindrical part, indicated by the axis z. Two types of injection of liquid (makeup or recycled) are defined:
  Injections (5) into the truncated-cone-shaped part of the item of equipment (1).
  Injections (6) into the cylindrical part of the item of equipment (1).

Injections (5) situated in the truncated-cone-shaped part (12) are inclined with respect to the wall of the conical bottom at an angle β1 in the vertical plane (xz) and at an angle β2 in the horizontal plane (xy), x denotes the horizontal axis, z denotes the vertical axis of the cylindrical part perpendicular to the horizontal plane (xy).

The injections (6) situated in the cylindrical part (11) are inclined with respect to the wall of the cylindrical body at an angle θ1 in the vertical plane (xz) and at an angle θ2 in the horizontal plane (xy).

The injections are advantageously orientated in the same direction of rotation in the horizontal plane (xy) and advantageously situated in the liquid part of the column bottom.

FIG. 3A shows the utilization of multiple of injections (6) in the cylindrical part (11) of the item of equipment (1), FIG. 3B shows the utilization of multiple of injections (5) in the truncated-cone-shaped part (12) of the item of equipment (1).

Figure 3:
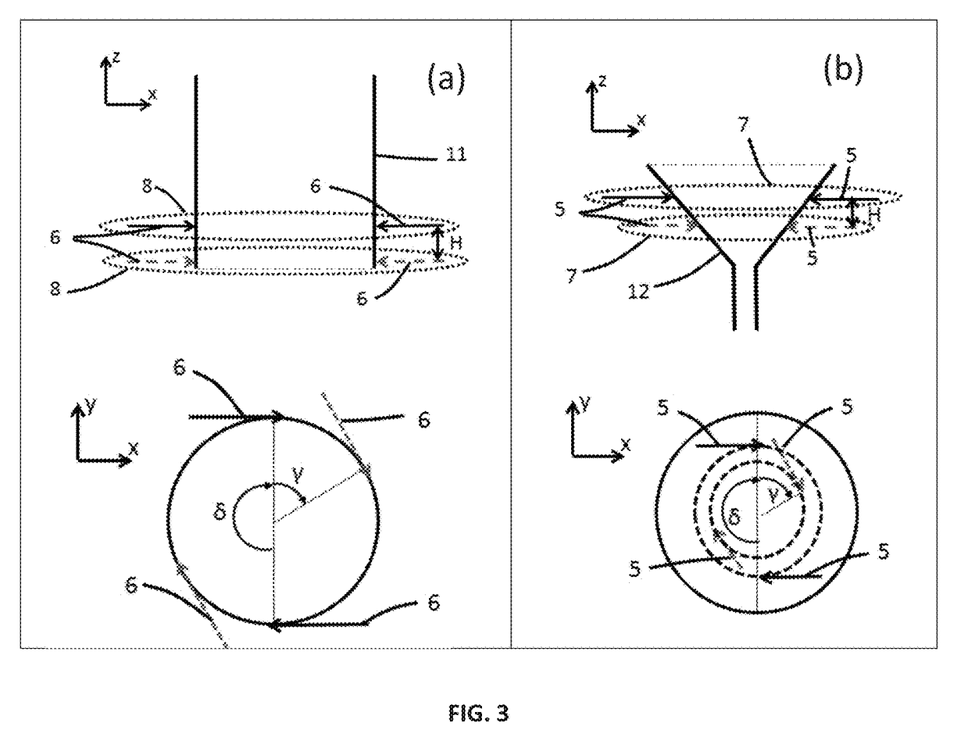
FIG. 3 shows the device according to the invention and the utilization of multiple lateral injections of liquid into the cylindrical and truncated-cone-shaped parts of the item of equipment—Front view and top view: (3A) multiple injections (6) into the cylindrical part of the item of equipment 1; (3B) multiple injections (5) into the truncated-cone-shaped part of the item of equipment 1

Placing the injections into the wall of the item of equipment is carried out according to horizontal layers (8) in the plane (xy) for injections (6) into the cylindrical part (11) and according to horizontal layers (7) for injections (5) into the truncated-cone-shaped part (12). Each layer of injections (7) in the truncated-cone-shaped part (12) and (8) in the cylindrical part (11) comprises respectively a number N of injections (5) or (6) located at the same height on the axis (z). In FIG. 3, N is equal to 2. Each layer is separated by a height H. Within one layer, each injection is separated from the next by an angle δ equal to 360/N in the plane (xy). As shown in FIG. 3, a layer of injections can be offset with respect to another layer of injections by an angle γ in the plane (xy).

The number of layers in each of the truncated-cone-shaped or cylindrical parts is advantageously comprised between 1 and 20, preferably between 1 and 10 and preferably between 1 and 6.

The velocity V of the liquid injected into the lateral injection pipes (5) and (6) is advantageously comprised between 0.05 m·s$^{-1}$ and 40 m·s$^{-1}$, preferably between 0.1 m·s$^{-1}$ and 30 m·s$^{-1}$ and very preferably between 0.5 m·s$^{-1}$ and 10 m·s$^{-1}$. Preferably, the diameters of the injection pipes are sized as a function of the flow rate of liquid to be injected in order to obtain the desired injection speeds.

The flow rate of liquid recycled via the recycling pipe (4) plus the flow rate of liquid injected via the pipe (10) to the flow rate of hydrocarbon-containing liquid (2) circulating in the item of equipment (1) is advantageously comprised between 1% and 400%, preferably between 5% and 100%, very preferably between 10% and 60% and yet more preferably between 20 and 50%.

The diameter D1 of the cylindrical part (11) of the item of equipment (1) is advantageously comprised between 0.1 m and 30 m, preferably between 0.5 m and 20 m, and very preferably between 1 m and 10 m.

The ratio between the diameter D1 of the cylindrical part (11) and the diameter D2 of the outlet pipe (9) at the bottom of the truncated-cone-shaped part (D1/D2) is advantageously comprised between 1.1 and 1000, preferably between 2 and 500 and preferably between 3 and 100.

The angle α is the angle of inclination of the truncated-cone-shaped part with respect to the vertical wall (axis z) of the cylindrical part and is advantageously comprised between 5° and 85°, preferably between 10 and 70°, very preferably between 15 and 60° and yet more preferably between 30 and 50°.

The angles β1 and θ1 are comprised between 5° and 175° with respect to the wall of the truncated-cone-shaped part and to the wall of the cylindrical part respectively, preferably between 10° and 150°, very preferably between 15° and 120° and more preferably between 15° and 90° and yet more preferably between 20° and 60°.

The angles β2 and θ2 are comprised between 90° and 270° with respect to the diameter along the axis γ of the cylindrical section, and preferably between 90° and 180°. Very preferably, the angles β2 and θ2 are equal to 90°.

The number of injections N through the wall of the item of equipment, into each horizontal layer (8) in the cylindrical part (11) and into each horizontal layer (7) in the truncated-cone-shaped part (12) is comprised between 1 and 30, preferably between 2 and 20, very preferably between 2 and 10, most preferably between 2 and 6. Each layer, whether within one and the same part or in both parts, can have a different number of injections N.

The height H between two layers is advantageously comprised between 0.01 m and 10 m, preferably between 0.05 m and 5 m and very preferably between 0.1 m and 1 m.

The angle δ separating the injections in the circumference of one and the same layer is comprised between 0° and 180°, preferably between 5° and 120°, very preferably between 10° and 90°. Advantageously, the angle δ is equal to 360/N where N denotes the number of injections per layer.

The angle γ denotes the angular offset of one layer with respect to the other. This angle can be comprised between 0° and 180°, preferably between 5° and 120°, very preferably between 10° and 90°.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1759606, filed Oct. 13, 2017 are incorporated by reference herein.

Examples

Computational Fluid Dynamics (CFD) mechanical simulations of the liquid/particles flow in an item of equipment with a conical bottom without injections (comparative) and in the same item of equipment with a conical bottom comprising a device with lateral injections of recycled liquid according to the invention were carried out using the Barracuda™ software. This software uses a Eulerian approach for the fluid phase and a pseudo-Lagrangian approach for the particulate phase (see publication D. M. Snider, *An Incompressible Three-Dimensional Multiphase Particle-in-Cell Model for Dense Particle Flows, Journal of Computational Physics* 170 (2001), 523-549).

Table 1 presents the simulated conditions, as well as the characteristics and dimensions of the item of equipment, including the device according to the invention (number of injections, number of layers, angles of injection).

TABLE 1

| Dimensions of the item of equipment | |
| --- | --- |
| Diameter D1 (m) | 1.2 |
| Diameter D2 (m) | 0.25 |
| Angle α | 45° |
| Number of layers in the cylindrical part | 1 |
| Number of layers in the truncated-cone-shaped part | 1 |
| Number of injections per layer | 2 |
| Angle β1 and θ1 | 30° |
| Angle β2 and θ2 | 90° |
| Operating conditions | |
| Density of hydrocarbon-containing liquid (2) (kg/m$^3$) | 990 |
| Flow rate of circulating hydrocarbon-containing liquid (2) (kg/s) | 7.5 |
| Injection rate (flow rate of the recycled liquid in the pipe (4) to flow rate of circulating hydrocarbon-containing liquid (2)) | 30% |
| Density of solid particles (kg/m$^3$) | 2800 |
| Diameter of solid particles (microns) | 50 |
| Flow rate of solid particles (kg/s) | 0.02 |

Figure 4:
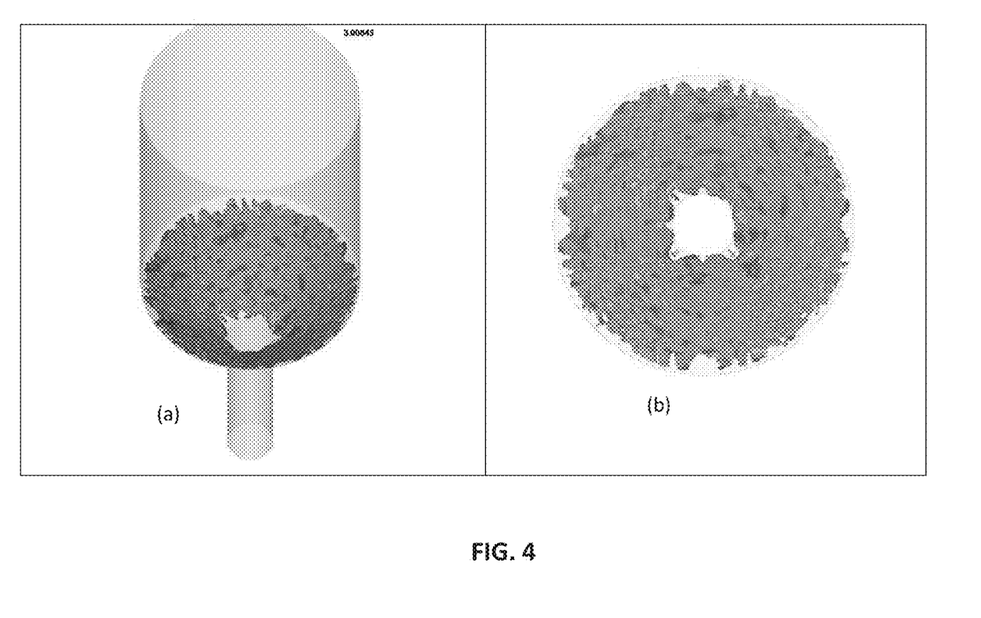
FIG. 4 (4A: isometric view 4B: top view) shows for the configuration without injection, the parts of the item of equipment where the volume fraction of the solid phase is greater than 0.1% by volume. These zones show the zones where solid particles have accumulated.

FIG. 4 (4A: isometric view, 4B: top view) shows for the configuration without injection (comparative), the parts of the item of equipment where the volume fraction of the solid phase is greater than 0.1% by volume. These zones represent the zones of accumulation of solid particles.

Figure 5:
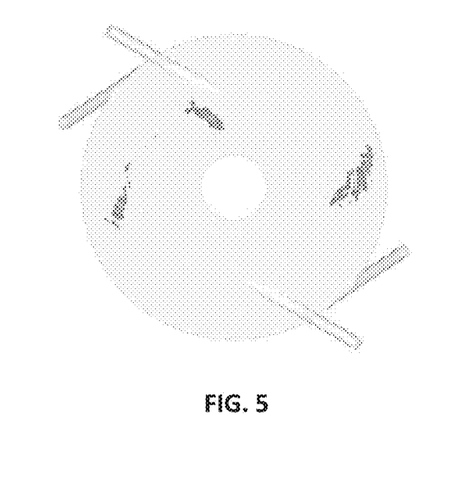
FIG. 5 shows for the configuration with injections, the parts of the item of equipment where the volume fraction of the solid phase is greater than 0.1% by volume.

FIG. 5 shows for the configuration with injections according to the invention, the parts of the item of equipment where the volume fraction of the solid phase is greater than 0.1% by volume, in a top view.

By comparing FIG. 4B and FIG. 5, a reduction in the zones of accumulation of solids is observed thanks to the utilization of the lateral injections of liquid with the device according to the invention. Calculating by volume, it appears that in the configuration according to the invention, with a recycling of 30% of the hydrocarbon-containing liquid for supplying two injections into the truncated-cone-shaped part and two injections into the cylindrical part with a geometry according to the invention, the number of accumulation zones as defined previously was divided by 30.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the conversion of hydrocarbon-containing feedstocks, comprising
achieving said conversion in a conversion unit producing an effluent, and
sending, as a feedstock, a hydrocarbon-containing liquid containing solid particles comprising compounds from said effluent to a device for descending flow of said hydrocarbon-containing liquid containing solid particles said device being situated in the lower part of an atmospheric or a vacuum distillation column,
said device comprising a cylindrical upper part (11) of diameter D1, a truncated-cone-shaped lower part (12) with an angle of inclination α of 5° to 85° with respect to the vertical axis (z) of said cylindrical upper part, an outlet pipe (9) of diameter D2, and
at least one injector (5) of recycled and/or makeup liquid into the truncated-cone-shaped part (12) of the item of equipment (1);
at least one injector (6) of recycled and/or makeup liquid into the cylindrical part (11) of the item of equipment (1);
said at least one injector (5) situated in said truncated-cone-shaped part being inclined with respect to the wall of the truncated-cone-shaped lower part at an angle β1 in the vertical plane (xz) and at an angle β2 in the horizontal plane (xy);
said at least one injector (6) situated in said cylindrical part being inclined with respect to the wall of the cylindrical upper part at an angle θ1 in the vertical plane (xz) and at an angle θ2 in the horizontal plane (xy),
wherein the angles β1 and θ1 are 5° to 175°, and the angles Γ2 and θ2 are 90° to 270°, the process comprising injecting recycled and/or makeup liquid by said at least one injector (5) into the truncated-cone-shaped part (12) and by said at least one injector (6) into the cylindrical part (11) at a velocity V of 0.05 m.s$^{-1}$ to 40 m.s$^{-1}$.

2. The process according to claim 1, wherein the device comprises a pipe (4) for recycling a part of the liquid leaving said outlet pipe (9), said recycling pipe (4) supplying recycled liquid to at least one of said at least one injectors (5) or (6).

3. The process according to claim 1, wherein the device comprises a makeup pipe (10) for supplying makeup liquid to at least one of said at least one injectors (5) or (6).

4. The process according to claim 1, wherein, in the device, said at least one injectors (5) and (6) are distributed by horizontal layers (7) in the truncated-cone-shaped part and by horizontal layers (8) in the cylindrical part, respectively.

5. The process according to claim 1, wherein, in the device, the diameter D1 of the cylindrical part and the diameter D2 of the outlet pipe at the bottom of the truncated-cone-shaped part has a ratio (D1/D2) of 1.1 to 1000.

6. The process according to claim 1, wherein, in the device, the angle α is 10° to 70°.

7. The process according to claim 1, wherein, in the device, the angles β1 and θ1 are 10° to 150°.

8. The process according to claim 1, wherein, in the device, the angles β2 and θ2 are 90° to 180°.

9. The process according to claim 8, wherein, in the device, the angles β2 and θ2 are equal to 90°.

10. The process according to claim 1, wherein, in the device, the diameter D1 is 0.1 m to 30 m.

11. The process according to claim 4, wherein, in the device, height H between two horizontal layers is 0.01 m to 10 m.

12. The process according to claim 4, wherein, in the device, 1 to 30 injectors N are present per layer.

13. The process according to claim 12, wherein, in the device, 2 to 20 injectors are present per layer, said injectors within one and the same layer being spaced at an angle δ equal to 360/N, where N denotes the number of injectors per layer.

14. The process according to claim 13, wherein, in the device, 2 to 10 injectors are present per layer.

15. The process according to claim 1, comprising a hydroconversion step in an ebullating bed for feedstocks containing hydrocarbon fractions of which at least 50% by weight have a boiling temperature greater than 300° C.

16. The process according to claim 1, wherein recycled and/or makeup liquid with respect to the hydrocarbon-containing liquid circulating in the atmospheric or a vacuum distillation column has an injection rate of 1% to 400%.

17. The process according to claim 1, wherein the device is situated in the lower part of an atmospheric column.

18. The process according to claim 1, wherein the device is situated in the lower part of a vacuum distillation column.

19. The process according to claim 1, wherein the liquid injected by said injectors has a velocity V of 0.1 $m.s^{-1}$ to 30 $m.s^{-1}$.

20. The process according to claim 1, wherein the liquid injected by said injectors has a velocity V of 0.5 $m.s^{-1}$ to 10 $m.s^{-1}$.

21. The process according to claim 1, wherein recycled and/or makeup liquid with respect to the hydrocarbon-containing liquid circulating in the item of equipment has an injection rate of 5% to 100%.

22. The process according to claim 1, wherein recycled and/or makeup liquid with respect to the hydrocarbon-containing liquid circulating in the item of equipment has an injection rate of 10% to 60%.

23. The process according to claim 1, wherein recycled and/or makeup liquid with respect to the hydrocarbon-containing liquid circulating in the item of equipment has an injection rate of 20% to 50%.

24. The process according to claim 1, wherein the conversion unit is an ebullating bed unit, or originates from a slurry hydroconversion process, or from a fixed bed, moving bed, or fluidized bed hydrotreatment process, or the effluent is a catalytic cracking (FCC) effluent, an effluent from a thermal conversion processes, coking or visbreaking, or from solvent deasphalting.

\* \* \* \* \*